(12) United States Patent
Wong

(10) Patent No.: US 9,319,086 B2
(45) Date of Patent: Apr. 19, 2016

(54) WIRELESS CHARGING STAND

(71) Applicant: Chih-Juh Wong, New Taipei (TW)

(72) Inventor: Chih-Juh Wong, New Taipei (TW)

(*) Notice: Subject to any disclaimer, the term of this patent is extended or adjusted under 35 U.S.C. 154(b) by 0 days.

(21) Appl. No.: 14/445,081

(22) Filed: Jul. 29, 2014

(65) Prior Publication Data

US 2016/0036478 A1 Feb. 4, 2016

(51) Int. Cl.
| | | |
|---|---|---|
| *H04M 1/00* | (2006.01) | |
| *H04B 1/38* | (2015.01) | |
| *H04B 1/3883* | (2015.01) | |
| *H02J 7/00* | (2006.01) | |
| *H02J 7/02* | (2006.01) | |
| *H04M 1/04* | (2006.01) | |
| *F16M 13/00* | (2006.01) | |
| *F16M 11/04* | (2006.01) | |

(52) U.S. Cl.
CPC ............ *H04B 1/3883* (2013.01); *H02J 7/0044* (2013.01); *H02J 7/025* (2013.01); *F16M 11/041* (2013.01); *F16M 13/00* (2013.01); *H04M 1/04* (2013.01)

(58) Field of Classification Search
CPC . F16M 11/041; F16M 11/12; F16M 11/2035; F16M 11/04; F16M 13/00; H04M 1/04; H02J 7/025; H02J 5/005; H02J 7/007; H02J 7/0044; H02J 2007/0096; H02J 7/0004; H04B 5/0037; H04B 5/0075; G06F 1/1632
USPC .................... 455/556.1, 557, 569.1, 571–573
See application file for complete search history.

(56) References Cited

U.S. PATENT DOCUMENTS

| 7,092,521 B2* | 8/2006 | Wang ...................... B60R 11/02 379/428.01 |
|---|---|---|
| 2007/0135174 A1* | 6/2007 | Musk ..................... H02J 7/0044 455/569.1 |
| 2011/0297711 A1* | 12/2011 | Yu ............................. A45F 5/00 224/272 |
| 2012/0252543 A1* | 10/2012 | Cho ...................... F16M 11/041 455/575.8 |
| 2012/0292463 A1* | 11/2012 | Burns ................... F16M 11/041 248/125.8 |
| 2013/0299652 A1* | 11/2013 | Graham ............... F16M 11/041 248/205.1 |
| 2014/0054343 A1* | 2/2014 | Longo .................. F16M 13/022 224/482 |
| 2015/0002088 A1* | 1/2015 | D'Agostino ............ H02J 7/025 320/108 |

* cited by examiner

*Primary Examiner* — Olumide T Ajibade Akonai

(57) ABSTRACT

A wireless charging stand is used to position a handheld electronic device and contains: a body, a wireless charging transmitter, a rotary head, a body, and a bluetooth mechanism accommodated in the body. The body includes an upper segment axially connected with the rotary head which universally rotates on the upper segment and couples with and removes from the handheld electronic device. The wireless charging transmitter is accommodated in or on the body to wirelessly charge power to the handheld electronic device. The bluetooth mechanism includes a bluetooth module, a speaker, and a first power component for supplying the power. The speaker and the first power component are electrically connected with the bluetooth module, the bluetooth module receives audio information of the handheld electronic device and plays the audio information by ways of the speaker, and the first power component is also electrically connected with the wireless charging transmitter.

8 Claims, 12 Drawing Sheets

100

WIRELESS CHARGING STAND

FIELD OF THE INVENTION

The present invention relates to a wireless charging stand which has bluetooth and wireless charging functions.

BACKGROUND OF THE INVENTION

A handheld electronic device, such as a mobile phone, is manually held by a user and is charged power by using a charger, a cable or a mobile power, so the handheld electronic device is charged the power within a limited range of a power source.

To overcome above-mentioned problem, a wireless charger is developed and contains a wireless charging transmitter and a wireless charging receiver, wherein the wireless charging transmitter has a first circuit board with a first coil, and the wireless charging receiver has a second circuit board with a second coil, such that a magnetic field forms on the first coil and acts on the second coil, thus resulting electromagnetic induction. Thereafter, the second coil generates inducing current to charge the power to the handheld electronic device.

However, the inducing current influence a power charge of the handheld electronic device based on magnetic flux of the second coil/per unit time, and the magnetic flux is limited by a distance and an angle between the wireless charging transmitter and the wireless charging receiver.

The present invention has arisen to mitigate and/or obviate the afore-described disadvantages.

SUMMARY OF THE INVENTION

The primary object of the present invention is to provide a wireless charging stand which is rotated universally, plays audio information of a handheld electronic device, and charges power to the handheld electronic device.

To obtain the above objective, a wireless charging stand provided by the present invention is used to position a handheld electronic device and contains: a body, a wireless charging transmitter, a rotary head, a body, and a bluetooth mechanism accommodated in the body.

The body includes an upper segment axially connected with the rotary head which universally rotates on the upper segment and couples with and removes from the handheld electronic device.

The wireless charging transmitter is accommodated in or on the body to wirelessly charge power to the handheld electronic device.

The bluetooth mechanism includes a bluetooth module, a speaker, and a first power component for supplying the power.

The speaker and the first power component are electrically connected with the bluetooth module, the bluetooth module receives audio information of the handheld electronic device and plays the audio information by ways of the speaker, and the first power component is also electrically connected with the wireless charging transmitter.

DETAILED DESCRIPTION OF THE PREFERRED EMBODIMENTS

Figure 1:
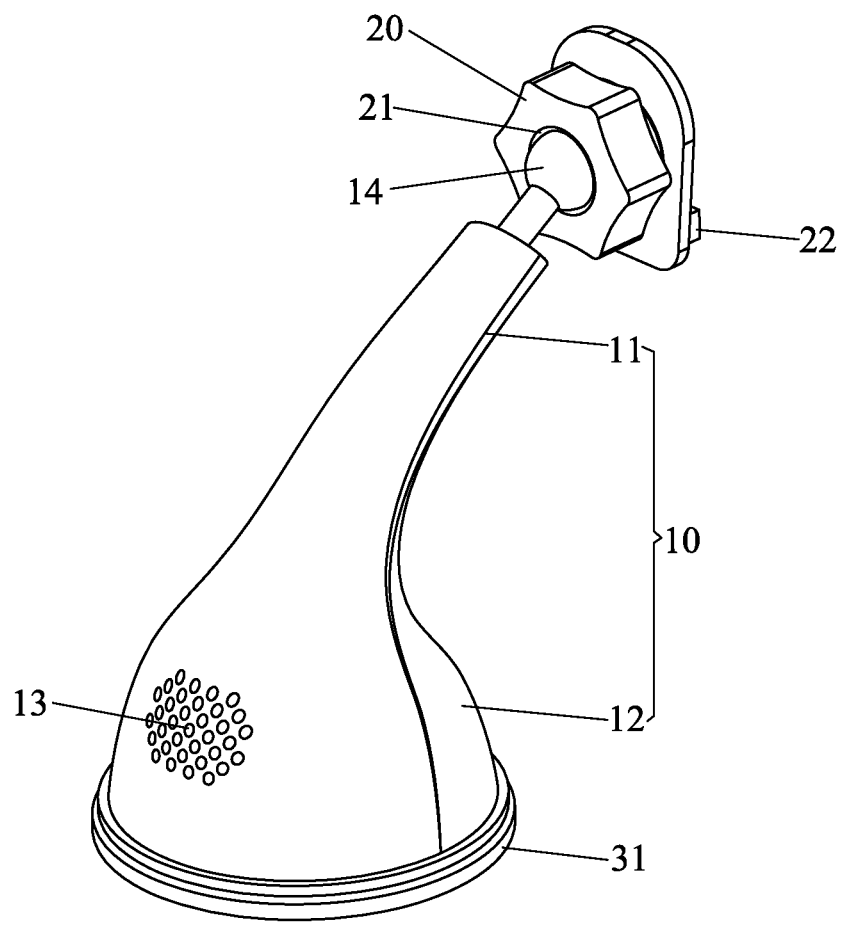
FIG. 1 is a perspective view of the assembly of a wireless charging stand according to a first embodiment of the present invention.
Figure 2:
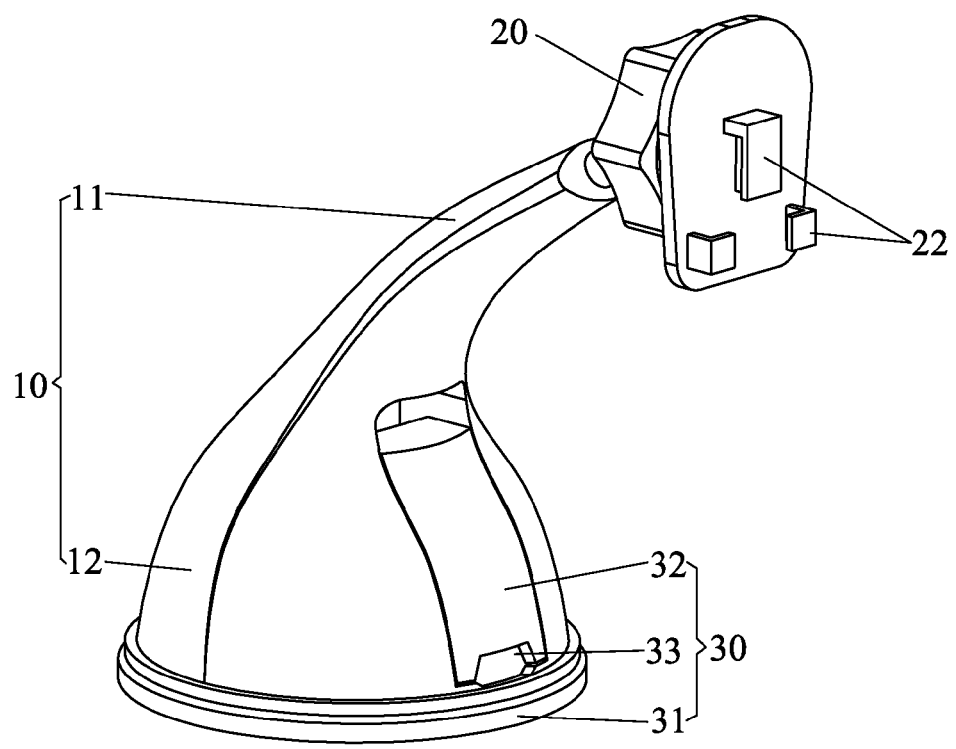
FIG. 2 is another perspective view of the assembly of the wireless charging stand according to the first embodiment of the present invention.
Figure 8:
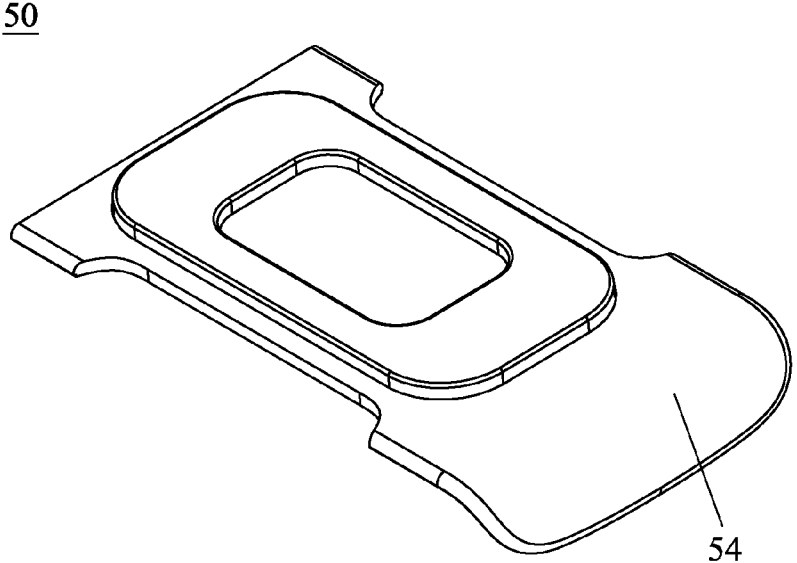
FIG. 8 is a perspective view of the exploded components of a retaining holder of the wireless charging stand according to the second embodiment of the present invention.
Figure 8:
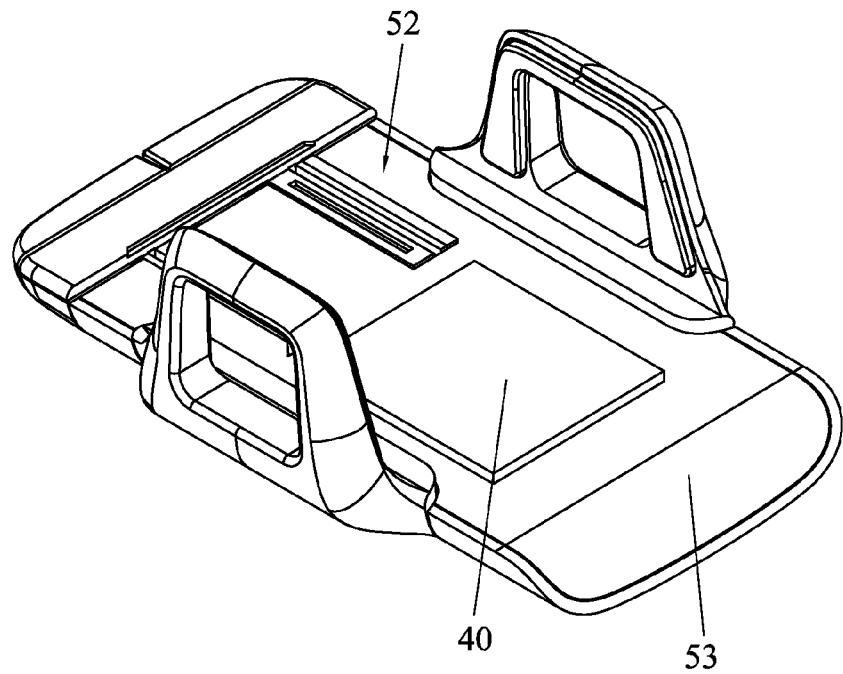

FIGS. 1 and 2, a wireless charging stand 100 according to a first embodiment of the present invention comprises: a body 10, a rotary head 20, and a bluetooth mechanism (not shown) accommodated in the body 10. The wireless charging stand 100 also comprises a wireless charging transmitter 40 (as shown in FIG. 8). The body 10 includes an upper segment 11 axially connected with the rotary head 20 which universally rotates on the upper segment 11 and couples with and removes from a handheld electronic device. The wireless charging transmitter 40 is accommodated in or on the body 10 to wirelessly charge power to the handheld electronic device, wherein the bluetooth mechanism includes a bluetooth module, a speaker, and a first power component for supplying the power. The speaker and the first power component are electrically connected with the bluetooth module, and the bluetooth module receives audio information of the handheld electronic device and plays the audio information by ways of the speaker. The first power component is also electrically connected with the wireless charging transmitter 40.

Preferably, the bluetooth mechanism also includes a receiver electrically connected with the bluetooth module to receive exterior sounds, and the exterior sounds are transmitted to the handheld electronic device via the bluetooth module.

The bluetooth mechanism further includes a volume control button electrically coupled with the speaker to adjust volumes of the speaker.

The body 10 also includes a guiding orifice 13 defined thereon and corresponding to the speaker, such that the exterior sounds are transmitted out of the speaker and into the receiver of the body 10 through the guiding orifice 13.

Referring to FIGS. 1 to 5, the wireless charging stand 100 further comprises a sucking mechanism 30 mounted on a lower segment 12 of the body 10 and used to position the wireless charging stand 100 securely, such that the handheld electronic device is fixed on the wireless charging stand 100 stably.

Figure 3:
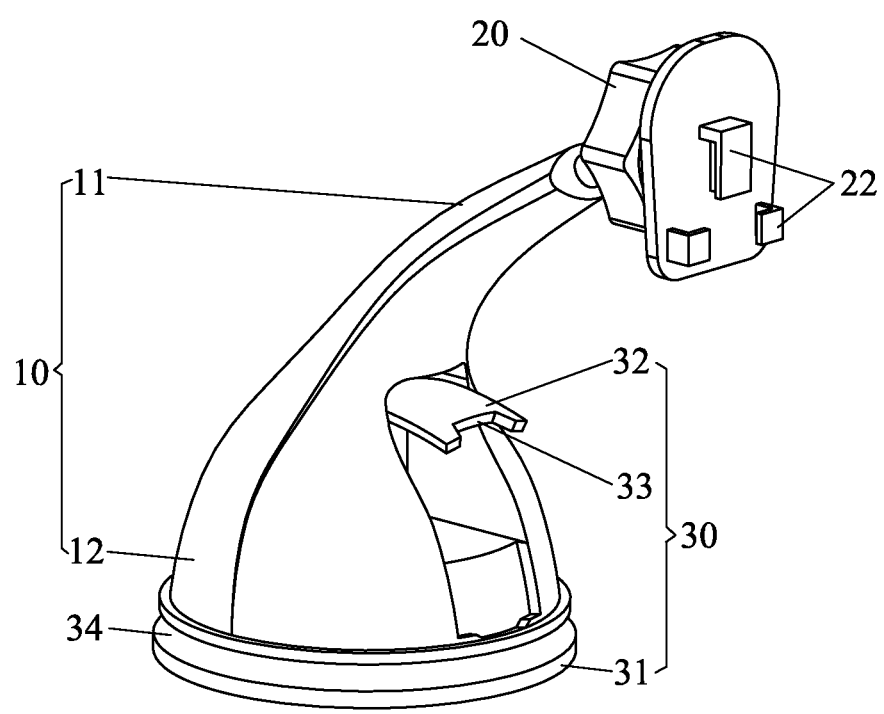
FIG. 3 is a perspective view of the operation of the wireless charging stand according to the first embodiment of the present invention.
Figure 4:
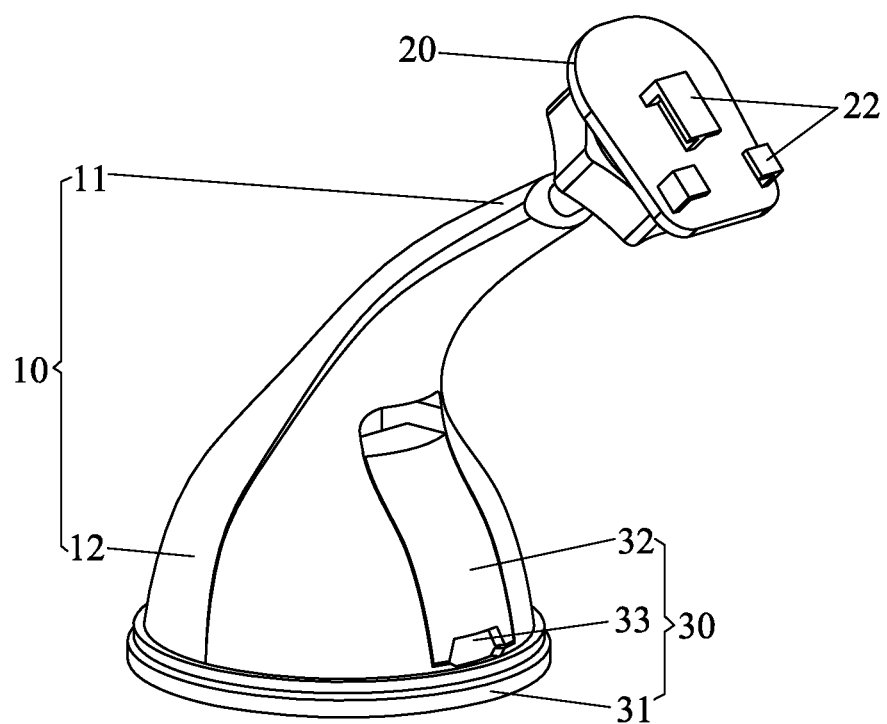
FIG. 4 is another perspective view of the operation of the wireless charging stand according to the first embodiment of the present invention.
Figure 5:
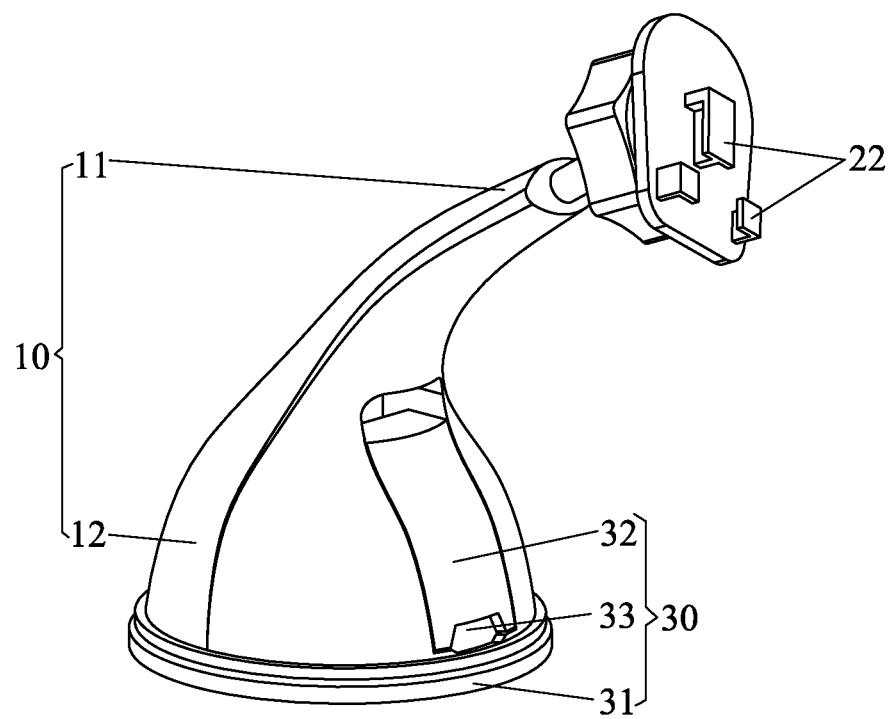
FIG. 5 is also another perspective view of the operation of the wireless charging stand according to the first embodiment of the present invention.

The sucking mechanism 30 includes a sucker 31 secured on the lower segment 12 of the body 10 and a flexible puller 32. The flexible puller 32 is rotatably joined with the body 10 and has a lower end inserted into the body 10 and flexibly connecting with the sucker 31. The flexible puller 32 also has an upper end exposing outside the body 10. The flexible puller 32 has an opening 33 defined on a bottom end thereof so that user's finger inserts into the opening 33 and pulls the flexible puller 32. As shown in FIG. 2, when the wireless charging stand 100 is mounted on a support surface, the user's finger inserts into the opening 33 and rotatably pulls the flexible puller 32, the upper end of the flexible puller 32 rotates toward the body 10, and the lower end of the flexible puller 32 pushes the sucker 31 to move downwardly so that a gap 34 forms between the sucker 31 and a bottom surface of the body 10 as illustrated in FIG. 3, and then the body 10 is lifted upwardly to remove the sucker 31 from the support surface, thus removing the wireless charging stand 100 from the support surface easily. In contrast, as desiring to position the wireless charging stand 100 on the support surface, the lower end of the flexible puller 32 is pressed downwardly to re-fix the flexible puller 32 as show in FIG. 2, and the sucker 31 contacts with the bottom surface of the body 10 so that the gap 34 between the sucker 31 and the body 10 reduces, hence the sucker 31 attracts the support surface to fix the wireless charging stand 100 on the support surface securely as illustrated in FIG. 2.

Referring to FIGS. 1 to 5, the body 10 is bent to avoid the handheld electronic device hitting the body 10 as rotating the handheld electronic device.

The body 10 further includes a rotating ball 14 connected with the upper segment 11 thereof, and the rotary head 20 includes a spherical cavity 21 for accommodating the rotating ball 14, such that the rotating ball 14 is universally rotated in the spherical cavity 21 so that the handheld electronic device universally rotates relative to the wireless charging stand 100. Thereby, the wireless charging stand 100 is simplified and is adjusted easily.

The rotary head 20 also includes at least one locking protrusion 22 arranged on a front end thereof, and the handheld electronic device has at least one recess 22 defined on a back end thereof and corresponding to the at least one locking protrusion 22, such that the at least one locking protrusion 22 engages with or disengage from the at least one recess, thus connecting/disengaging the handheld electronic device with/from the rotary head 20.

Figure 6:
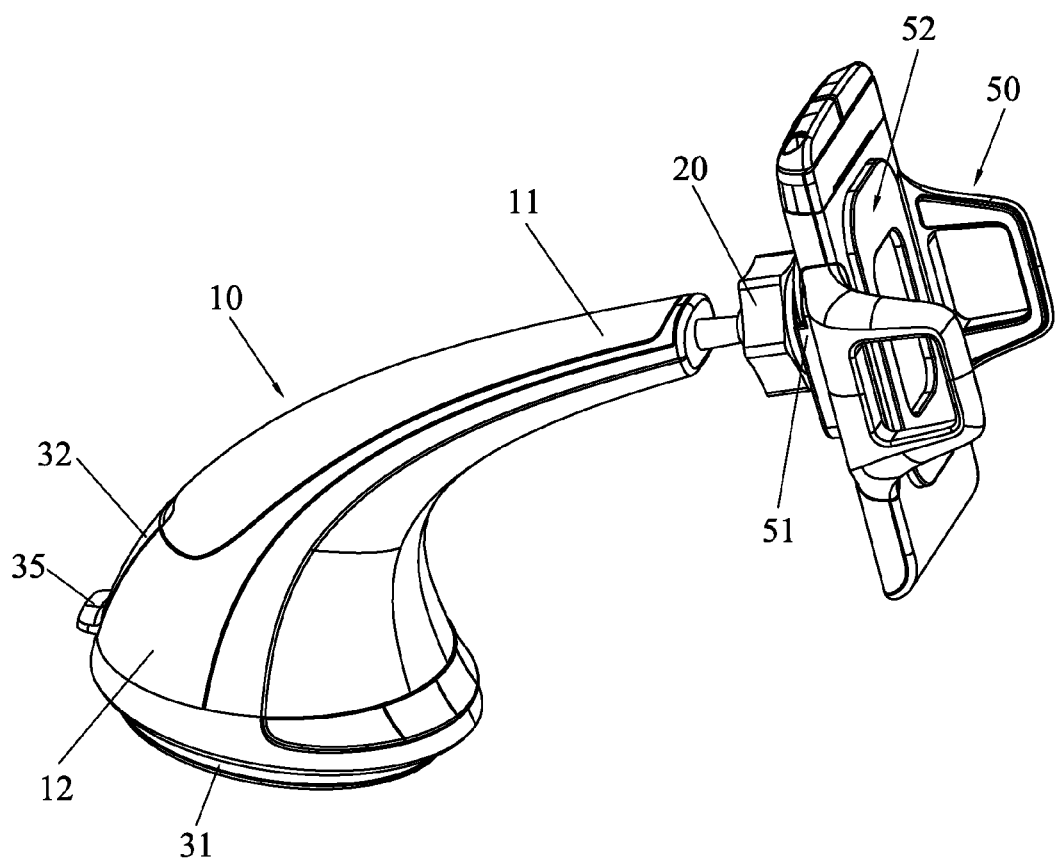
FIG. 6 is a perspective view of the assembly of a wireless charging stand according to a second embodiment of the present invention.
Figure 7:
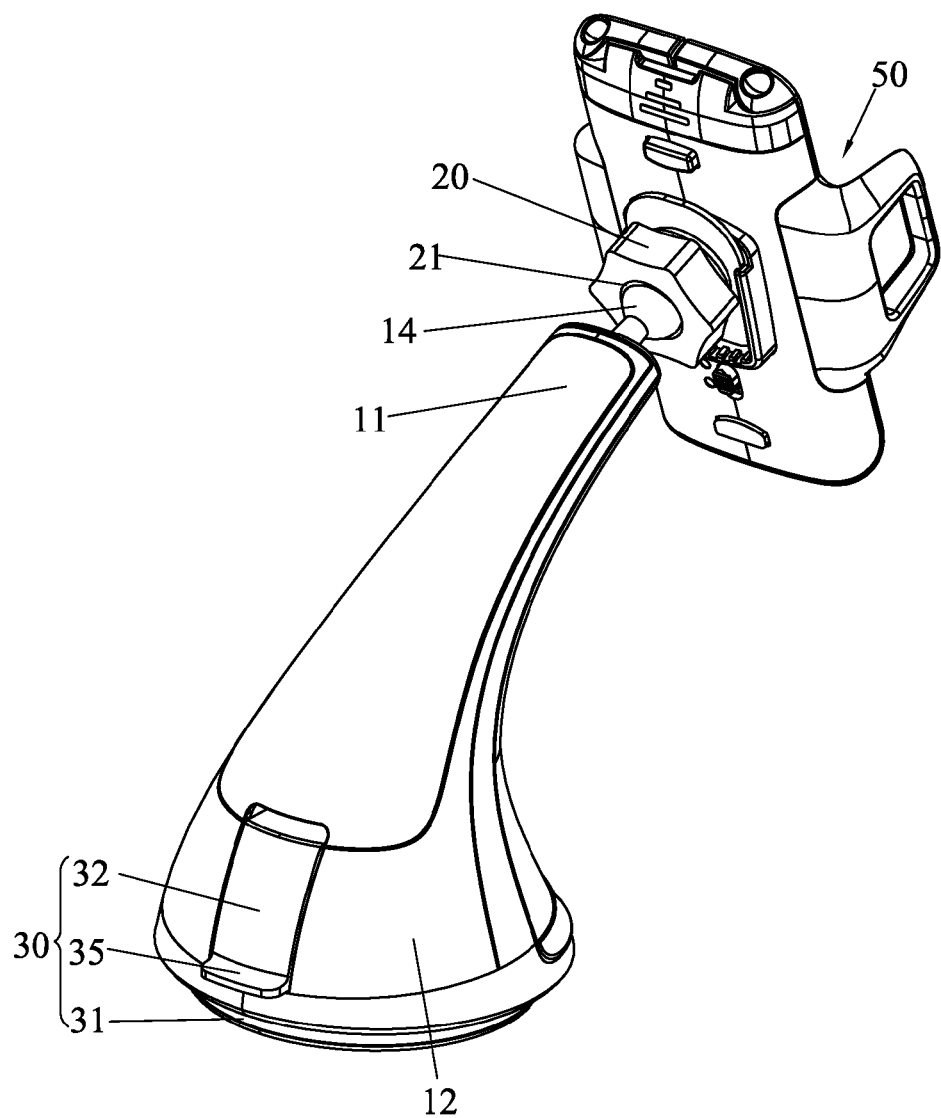
FIG. 7 is another perspective view of the assembly of the wireless charging stand according to the second embodiment of the present invention.

As shown in FIGS. 6 to 8, a difference of a wireless charging stand 100 of a second embodiment of the present invention from that of the first embodiment comprises: a retaining holder 50 for engaging with or disengaging from the rotary head 20 and the handheld electronic device. In this embodiment, the wireless charging transmitter 40 is fixed on the retaining holder 50. Furthermore, the retaining holder 50 has at least one notch 51 defined on a back surface thereof and corresponding to the at least one locking protrusion 22, such that the retaining holder 50 is connected with or disconnected from the rotary head 20 by engaging/disengaging the at least one locking protrusion 22 with/from the at least one notch 51. The retaining holder 50 also has an engagement area 52 formed on a front surface thereof for engaging with or disengaging from the handheld electronic device.

In this embodiment, the wireless charging transmitter 40 is accommodated in a bottom plate of the retaining holder 50, and the bottom plate has a lower cover 53 and an upper cover 54 for matching with the lower cover 53, such that the wireless charging transmitter 40 is defined between the bottom cover 53 and the upper cover 54. In addition, the retaining holder 50 further has a second power component disposed therein to electrically connect with the first power component and the wireless charging transmitter 40, such that the second power component independently supplies the power to the wireless charging transmitter 40, and the wireless charging transmitter 40 charges the power to the handheld electronic device.

In operation, the handheld electronic device is directly engaged with the engagement area 52 of the retaining holder 50 or its protective case is retain with the engagement area 52, such that after the retaining holder 50 is adjusted relative to the body 10, the handheld electronic device universally rotates relative to the wireless charging stand 100.

With reference to FIG. 7, a flexible puller 32 of the second embodiment has an operating tab 35 extending outwardly from a bottom end thereof so that when the user's finger pulls the operating tab 35 outwardly, the bottom end of the flexible puller 32 rotates outwardly and the upper end of the flexible puller 32 inwardly rotates to the body 10, such that the upper end of the flexible puller 32 pushes the sucker to move downwardly, and the gap forms between the sucker 31 and the body 10, thus removing the body 10 from the support surface easily.

Accordingly, the handheld electronic device is universally rotated on the wireless charging stand 100 randomly and stably.

Figure 9:
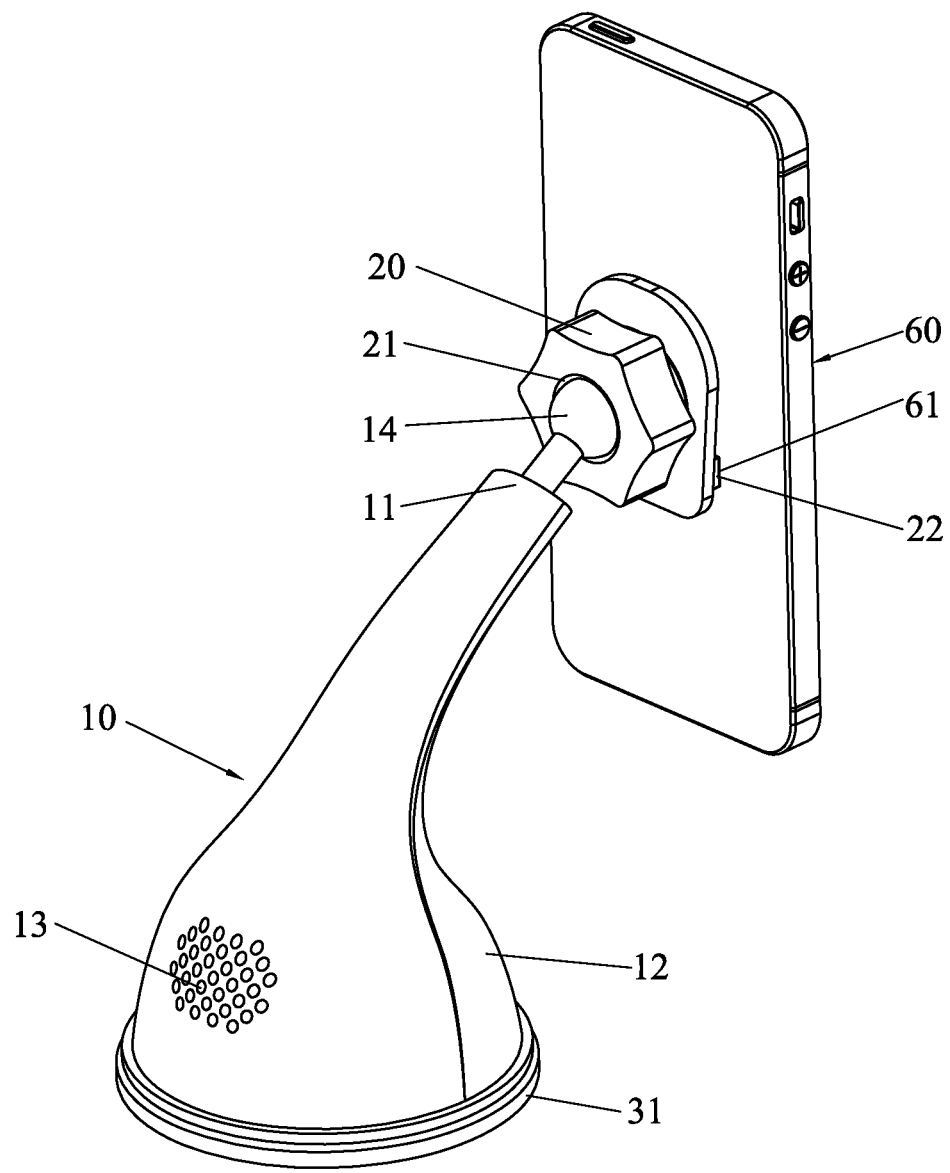
FIG. 9 is a perspective view of the assembly of a wireless charging stand according to a third embodiment of the present invention.
Figure 10:
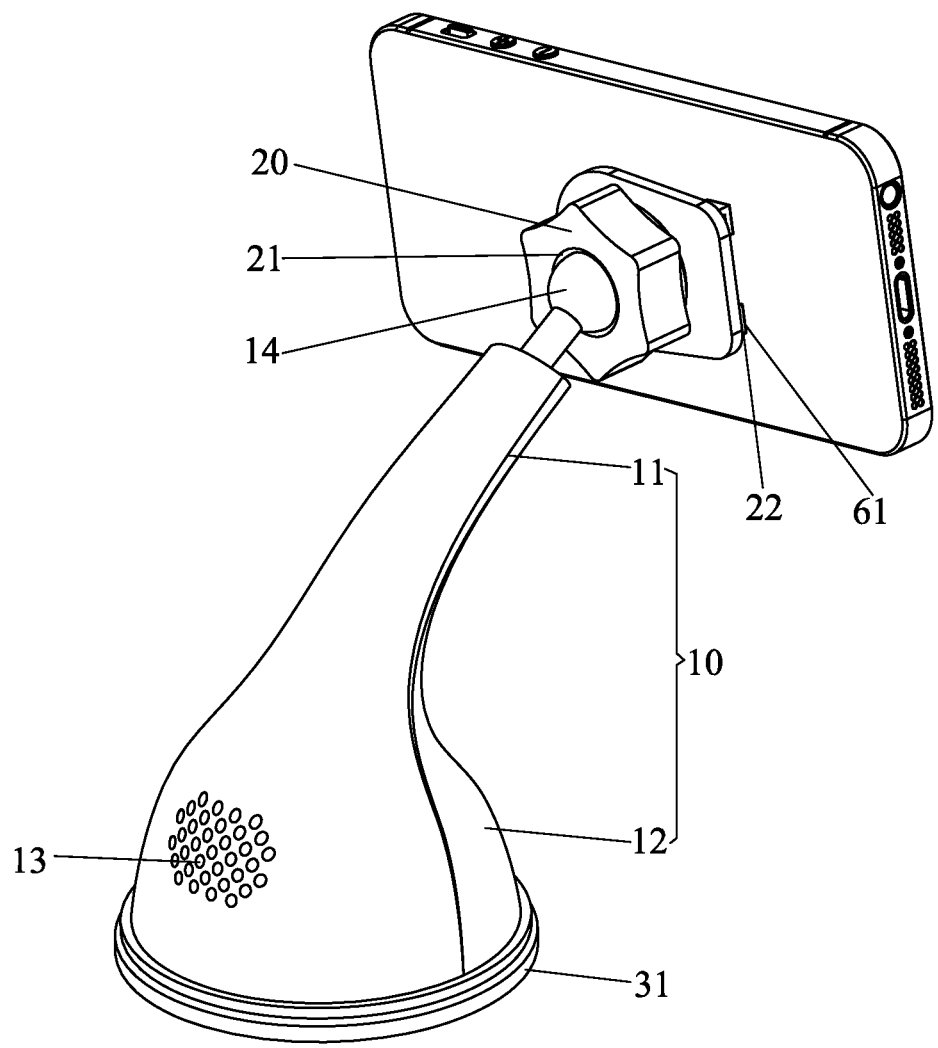
FIG. 10 is another perspective view of the assembly of the wireless charging stand according to the third embodiment of the present invention.

As shown in FIGS. 9 and 10, the protective case 60 of a mobile phone is connected with the wireless charging stand 100, wherein the protective case 60 has at least one trough 61 for cooperating with the at least one locking protrusion 22, such that the mobile phone is connected with or disconnected from the wireless charging stand 100 by engaging/disengaging the at least one trough 61 with/from the at least one locking protrusion 22. Thereby, the mobile phone is universally rotated on the wireless charging stand 100.

Figure 11:
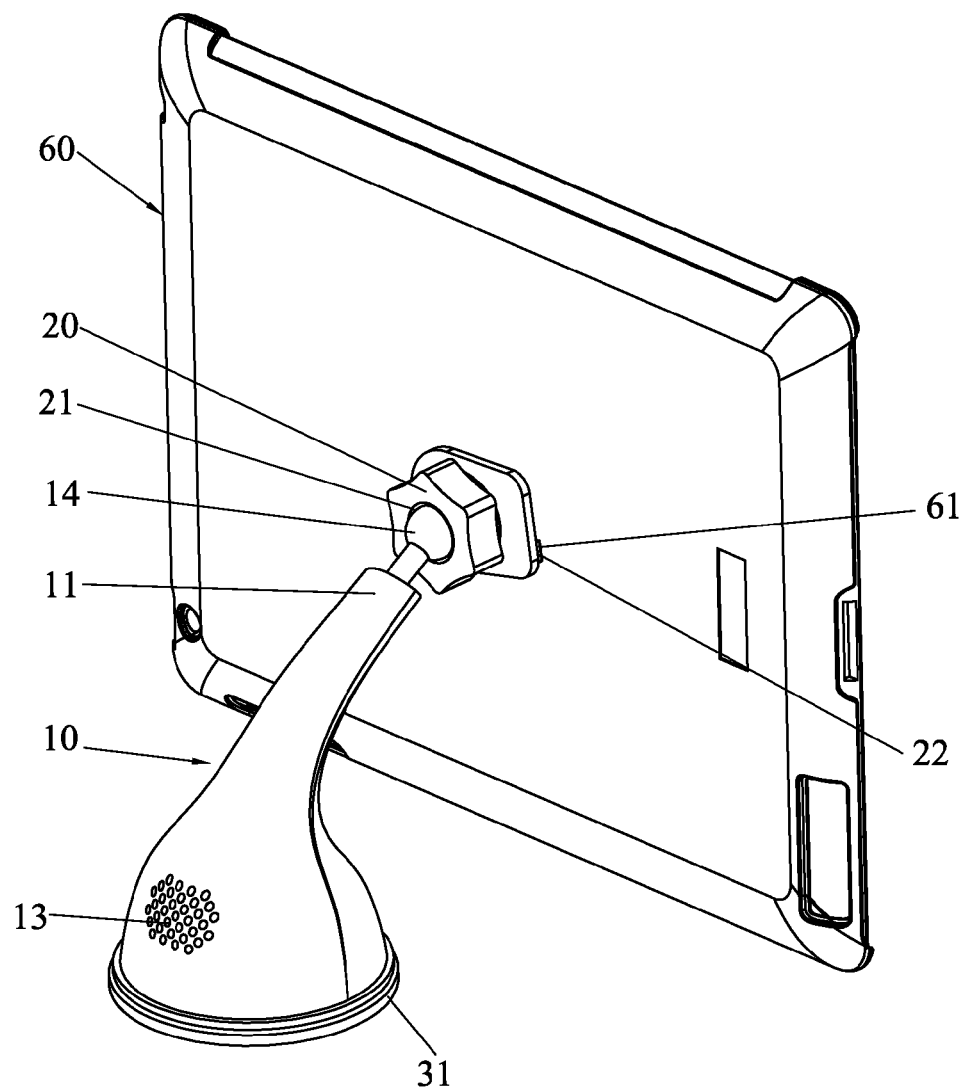
FIG. 11 is a perspective view of the assembly of a wireless charging stand according to a fourth embodiment of the present invention.
Figure 12:
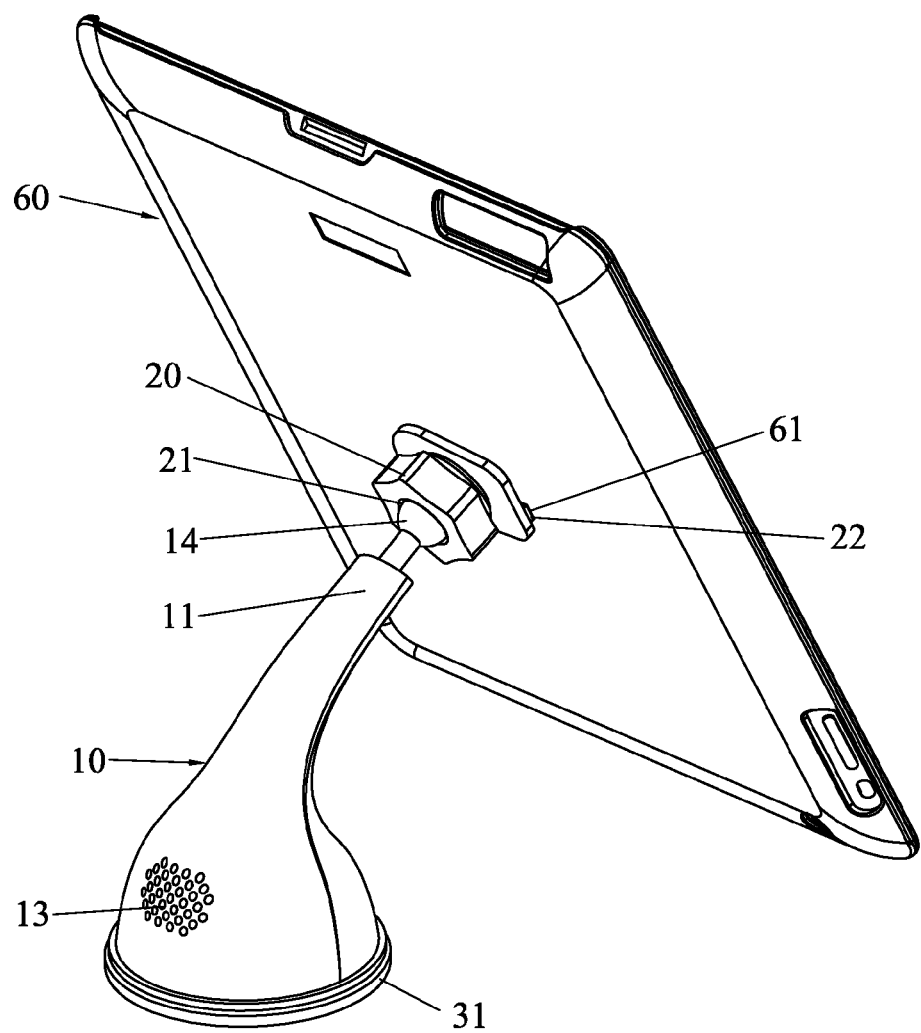
FIG. 12 is another perspective view of the assembly of the wireless charging stand according to the fourth embodiment of the present invention.

As illustrated in FIGS. 11 and 12, the protective case 60 of a tablet PC is connected with the wireless charging stand 100, and the tablet PC is universally rotated on the wireless charging stand 100. Preferably, any one of a PDA, a handheld game console, and a navigator is engaged with or disengaged from the protective case 60 so as to universally rotate on the wireless charging stand 100.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A wireless charging stand being used to position a handheld electronic device and comprising: a body, a wireless charging transmitter, a rotary head, and a bluetooth mechanism accommodated in the body;

the body including an upper segment axially connected with the rotary head which universally rotates on the upper segment and couples with and removes from the handheld electronic device;

the wireless charging transmitter being accommodated in or on the body to wirelessly charge power to the handheld electronic device; wherein the bluetooth mechanism includes a bluetooth module, a speaker, and a first power component for supplying the power;

a retaining holder is configured to engage with or disengage from the rotary head and the handheld electronic device, and the wireless charging transmitter is fixed on the retaining holder;

the speaker and the first power component are electrically connected with the bluetooth module, the bluetooth module receives audio information of the handheld electronic device and plays the audio information by ways of the speaker, and the first power component is also electrically connected with the wireless charging transmitter;

the retaining holder has a second power component disposed therein to electrically connect with the first power component and the wireless charging transmitter; and the rotary head also includes at least one locking protrusion arranged on a front end thereof, and the handheld electronic device has at least one recess defined on a back end thereof and corresponding to the at least one locking protrusion, such that the at least one locking protrusion of the rotary head engages with or disengages from the at least one recess of the handheld electronic device, and the handheld electronic device connects with or disengage from the rotary head.

2. The wireless charging stand as claimed in claim 1, wherein the bluetooth mechanism also includes a receiver electrically connected with the bluetooth module to receive exterior sounds, and the exterior sounds are transmitted to the handheld electronic device via the bluetooth module.

3. The wireless charging stand as claimed in claim 1, wherein the bluetooth mechanism further includes a volume control button electrically coupled with the speaker.

4. The wireless charging stand as claimed in claim 1 comprising a sucking mechanism mounted on a lower segment of the body and used to position a wireless charging stand on a support surface.

5. The wireless charging stand as claimed in claim 4, wherein the sucking mechanism includes a sucker secured on the lower segment of the body and includes a flexible puller rotatably joined with the body, the flexible puller has a lower end inserted into the body and flexibly connecting with the sucker, and the flexible puller also has an upper end exposing outside the body.

6. The wireless charging stand as claimed in claim 1, wherein the body is bent.

7. The wireless charging stand as claimed in claim 1, wherein the body also includes a guiding orifice defined thereon and corresponding to the speaker.

8. The wireless charging stand as claimed in claim 1, wherein the body further includes a rotating ball connected with the upper segment thereof, and the rotary head includes a spherical cavity for accommodating the rotating ball, such that the rotating ball is universally rotated in the spherical cavity.

* * * * *